United States Patent
Nishikawa

(10) Patent No.: US 10,526,474 B2
(45) Date of Patent: Jan. 7, 2020

(54) RUBBER COMPOSITION FOR TIRE AND PNEUMATIC TIRE

(71) Applicant: Toyo Tire Corporation, Itami-shi, Hyogo (JP)

(72) Inventor: Yuma Nishikawa, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 16/253,876

(22) Filed: Jan. 22, 2019

(65) Prior Publication Data
US 2019/0233622 A1    Aug. 1, 2019

(30) Foreign Application Priority Data

Jan. 31, 2018   (JP) ................. 2018-014618

(51) Int. Cl.
| | |
|---|---|
| *C08L 9/00* | (2006.01) |
| *B60C 1/00* | (2006.01) |
| *C08K 3/36* | (2006.01) |
| *C08K 5/103* | (2006.01) |
| *C08K 5/11* | (2006.01) |
| *C08K 3/04* | (2006.01) |

(52) U.S. Cl.
CPC ............. *C08L 9/00* (2013.01); *B60C 1/0016* (2013.01); *B60C 1/0025* (2013.01); *C08K 3/36* (2013.01); *C08K 5/103* (2013.01); *C08K 5/11* (2013.01); *C08K 3/04* (2013.01)

(58) Field of Classification Search
CPC ....... C08L 9/00; B60C 1/0016; B60C 1/0025; C08K 3/36; C08K 5/103; C08K 5/11; C08K 3/04
USPC ....................................................... 523/155
See application file for complete search history.

(56) References Cited

U.S. PATENT DOCUMENTS

2017/0158842 A1    6/2017 Tsukishima et al.

FOREIGN PATENT DOCUMENTS

| JP | 2014-210829 A | 11/2014 |
| JP | 2015-972 A | 1/2015 |
| JP | 2016-113515 A | 6/2016 |

OTHER PUBLICATIONS

English language machine translation of JP 2014-210829 (Year: 2014).*

* cited by examiner

*Primary Examiner* — Angela C Scott
(74) *Attorney, Agent, or Firm* — Westerman, Hattori, Daniels & Adrian, LLP

(57) ABSTRACT

Processability and abrasion resistance are improved in a rubber composition having silica added thereto. The rubber composition for a tire comprises a diene rubber, silica and an ether ester that is monoester and/or diester of polyoxyalkylene glycerin fatty acid ester represented by the following formula (1):

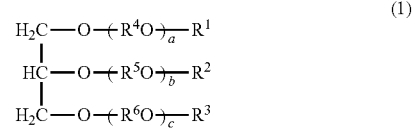

(1)

wherein $R^1$, $R^2$ and $R^3$ each represent a hydrogen atom or an acyl group having a saturated or unsaturated alkyl group having 6 to 30 carbon atoms, provided that at least one of $R^1$, $R^2$ and $R^3$ is an acyl group, $R^4$, $R^5$ and $R^6$ each independently represent an alkylene group having 2 to 4 carbon atoms, a, b and c each independently represent an average number of moles added and 60 mass % or more of $(R^4O)_a$, $(R^5O)_b$ and $(R^6O)_c$, consists of an oxyethylene group. A pneumatic tire manufactured using the rubber composition is disclosed.

7 Claims, No Drawings

RUBBER COMPOSITION FOR TIRE AND PNEUMATIC TIRE

CROSS-REFERENCE TO RELATED APPLICATIONS

This application is based upon and claims the benefit of priority from the prior Japanese Patent Application No. 2018-14618, filed on Jan. 31, 2018; the entire contents of which are incorporated herein by reference.

BACKGROUND

1. Technical Field

The present invention relates to a rubber composition for a tire and a pneumatic tire using the rubber composition.

2. Background Art

It is known in a rubber composition for a tire to use silica as a filler from the standpoint of achieving excellent effects of both low rolling resistance and grip performance on a wet road surface. However, silica is easy to be coagulated by silanol groups present on the surface of particles thereof, and increases a viscosity of a rubber composition during kneading and causes deterioration of processability thereof.

A rubber composition for a tire is required to improve abrasion resistance. Particularly, it is difficult to improve both processability and abrasion resistance in a rubber composition having a large amount of silica added thereto.

JP-A-2016-113602 and JP-A-2016-113515 propose to add glycerin monofatty acid ester in order to improve dispersibility of silica. JP-A-2015-000972 proposes to add a nonionic surfactant comprising polyethylene glycol monofatty acid ester and/or polyethylene glycol difatty acid ester in order to improve appearance of a tire while maintaining or improving low fuel consumption and abrasion resistance.

JP-A-2014-210829 proposes to use both polyoxyethylene hydrogenated castor oil and polyoxyethylene glycerin trifatty acid ester as a dispersing agent of silica. However, it was not known that both processability and abrasion resistance can be improved by using monoester or diester of polyoxyalkylene glycerin fatty acid ester.

SUMMARY

An object of an embodiment of the present invention is to provide a rubber composition for a tire that can improve both processability and abrasion resistance in a rubber composition having silica added thereto.

The rubber composition for a tire according to an embodiment of the present invention comprises a diene rubber, silica and an ether ester that is monoester and/or diester of polyoxyalkylene glycerin fatty acid ester represented by the following general formula (1):

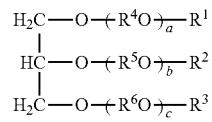

(1)

wherein $R^1$, $R^2$ and $R^3$ each represent a hydrogen atom or an acyl group having a saturated or unsaturated alkyl group having 6 to 30 carbon atoms, provided that at least one of $R^1$, $R^2$ and $R^3$ is an acyl group, $R^4$, $R^5$ and $R^6$ each independently represent an alkylene group having 2 to 4 carbon atoms, a, b and c each independently represent an average number of moles added and 60 mass % or more of $(R^4O)_a$, $(R^5O)_b$ and $(R^6O)_c$ consists of an oxyethylene group.

A pneumatic tire according to an embodiment of the present invention is manufactured using the rubber composition.

According to the embodiment of the present invention, both processability and abrasion resistance of the rubber composition having silica added thereto can be improved by adding the ether ester.

DETAILED DESCRIPTION

The rubber composition according to the present embodiment comprises a diene rubber having added thereto silica and a specific ether ester.

The diene rubber as a rubber component is not particularly limited. Examples of the diene rubber include various diene rubbers generally used in a rubber composition, such as natural rubber (NR), synthetic isoprene rubber (IR), butadiene rubber (BR), styrene-butadiene rubber (SBR), nitrile rubber (NBR), chloroprene rubber (CR), butyl rubber (IIR), styrene-isoprene copolymer rubber, butadiene-isoprene copolymer rubber and styrene-isoprene-butadiene copolymer rubber. Those diene rubbers can be used in one kind alone or as mixtures of two or more kinds.

The diene rubber according to one preferred embodiment comprises at least one selected from the group consisting of styrene-butadiene rubber, butadiene rubber and natural rubber, preferably comprises at least styrene-butadiene rubber and more preferably comprises styrene-butadiene rubber and butadiene rubber. For example, 100 parts by mass of the diene rubber comprise 50 to 100 parts by mass of styrene-butadiene rubber, 0 to 50 parts by mass of butadiene rubber and 0 to 50 parts by mass of natural rubber, preferably 50 to 90 parts by mass of styrene-butadiene rubber and 10 to 50 parts by mass of butadiene rubber and more preferably 60 to 85 parts by mass of styrene-butadiene rubber and 15 to 40 parts by mass of butadiene rubber.

The silica as a filler is not particularly limited, and for example, wet silica such as silica by wet precipitation method or silica by wet gelation method may be used. BET specific surface area (measured according to BET method described in JIS K6430) of the silica is not particularly limited, and is, for example, 100 to 300 m²/g and preferably 150 to 250 m²/g.

The amount of the silica added is preferably 20 to 120 parts by mass, more preferably 50 to 120 parts by mass and still more preferably 70 to 120 parts by mass, per 100 parts by mass of the diene rubber. In the present invention, silica is preferably used as main filler. In other words, the amount of silica in the filler is preferably more than 50 mass % and more preferably more than 70 mass %, based on the mass of the filler.

The filler may be silica alone, but carbon black may be added together with silica. The carbon black is not particularly limited and can use various kinds of carbon black. When the carbon black is used in a tire tread rubber, carbon blacks of SAF grade (N100 Series), ISAF grade (N200 Series), HAF grade (N300 Series) and FEF grade (N500 Series) (those are all ASTM grade) are preferably used. Those carbon blacks of each grade can be used in one kind alone or as mixtures of two or more kinds thereof. The amount of the carbon black added is not particularly limited, and is, for example, 20 parts by mass or less and preferably 5 to 15 parts by mass, per 100 parts by mass the diene rubber.

The rubber composition according to the present embodiment contains an ether ester that is monoester and/or diester of polyoxyalkylene glycerin fatty acid ester represented by the following general formula (1). The ether ester is monofatty acid ester and/or difatty acid ester of polyoxyalkylene glycerin and it is considered that an ether moiety thereof is adsorbed on the surface of silica, thereby aggregation of silica is suppressed. As a result, increase of a viscosity during kneading is suppressed. Furthermore, it is considered that adsorption of a vulcanization accelerator on the surface of silica is suppressed and a vulcanization reaction proceeds efficiently. As a result, the rubber composition shows high tensile stress. Furthermore, it is considered that affinity for the diene rubber is improved by an alkyl group in the acyl group and flexibility of the diene rubber is improved. Thus, it is considered that the ether ester acts to both the diene rubber and silica and as a result, abrasion resistance can be improved, differing from a processing aid such as metal soap.

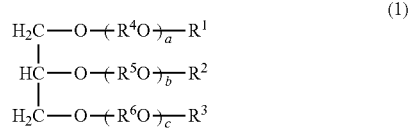

(1)

In the formula (1), $R^1$, $R^2$ and $R^3$ each represent a hydrogen atom or an acyl group having a saturated or unsaturated alkyl group having 6 to 30 carbon atoms (that is, —COR when the alkyl group is R), and at least one of $R^1$, $R^2$ and $R^3$ is an acyl group. The alkyl group in the acyl group may be a straight or branched alkyl group and have preferably 6 to 25 carbon atoms, more preferably 8 to 22 carbon atoms and still more preferably 10 to 20 carbon atoms. When two or more acyl groups are present in one molecule, those groups may be the same or different. The saturated alkyl group used herein means a group represented by $C_nH_{2n+1}$— wherein n is an integer. The unsaturated alkyl group used herein means a monovalent aliphatic hydrocarbon group having an unsaturated bond such as double bond and is, for example, an alkenyl group.

Monoester and/or diester of the polyoxyalkylene glycerin fatty acid ester represented by the formula (1) are used in the present embodiment. When the monoester and/or diester are used, improvement effect of processability and abrasion resistance can be enhanced. Use of triester is poor in the improvement effect of abrasion resistance. The monoester comprises a compound represented by the formula (1) wherein one of $R^1$, $R^2$ and $R^3$ is an acyl group and two of those are a hydrogen atom, as a main component. The diester comprises a compound represented by the formula (1) wherein two of $R^1$, $R^2$ and $R^3$ are an acyl group and one of those is a hydrogen atom, as a main component. The main component used herein means a component having the maximum molar ratio.

The polyoxyalkylene glycerin fatty acid ester may have distribution in the degree of esterification. Therefore, the ether ester may contain the compound represented by the formula (1) wherein all of $R^1$, $R^2$ and $R^3$ is an acyl group and/or the compound wherein all of $R^1$, $R^2$ and $R^3$ is a hydrogen atom, in a range that does not impair the above effect. For example, an average degree of esterification of the ether ester is preferably 0.8 to 2.2, more preferably 0.9 to 2.1 and still more preferably 1.0 to 2.0. The average degree of esterification used herein means an arithmetic average of the number (the degree of esterification) in which hydrogen atoms of three hydroxyl group in the polyoxyalkylene glycerin have been substituted with acyl groups, that is, a ratio of molar number of esterified fatty acid to 1 mole of polyoxyalkylene glycerin, and is at most 3. An average degree of esterification is calculated using $^{13}$C-NMR.

$R^4$, $R^5$ and $R^6$ in the formula (1) each independently represent an alkylene group having 2 to 4 carbon atoms, a, b and c each independently represent an average number of moles of the oxyalkylene group added. $R^4$, $R^5$ and $R^6$ are preferably each independently represent an alkylene group having 2 or 3 carbon atoms. The alkylene group of $R^4$, $R^5$ and $R^6$ may be linear and may be branched. Examples of the alkylene group represented by $R^4O$, $R^5O$ and $R^6O$ each include an oxyethylene group, an oxypropylene group and an oxybutylene group. $(R^4O)_a$, $(R^5O)_b$ and $(R^6O)_c$ in the formula (1) are a polyoxyalkylene chain obtained by addition polymerizing an alkylene oxide having 2 to 4 carbon atoms (for example, ethylene oxide, propylene oxide and butylene oxide), respectively. The form of polymerization of alkylene oxide and the like is not particularly limited, and the polymer may be a homopolymer, a random copolymer and a block copolymer.

$(R^4O)_a$, $(R^5O)_b$ and $(R^6O)_c$ in the formula (1) preferably mainly comprise an oxyethylene group and 60 mass % or more of $(R^4O)_a$, $(R^5O)_b$ and $(R^6O)_c$ preferably consists of an oxyethylene group. Specifically, the polyoxyalkylene chain represented by $(R^4O)_a$, the polyoxyalkylene chain represented by $(R^5O)_b$ and the polyoxyalkylene chain represented by $(R^6O)_c$ contain an oxyethylene group in the total amount of preferably 60 mass % or more, more preferably 80 mass % or more and particularly preferably 100 mass % (that is, consisting of only the oxyethylene group as shown in the following formula (2)). As one example, $(R^4O)_a$, $(R^5O)_b$ and $(R^6O)_c$ preferably comprise 60 mass % or more of the oxyethylene group, respectively.

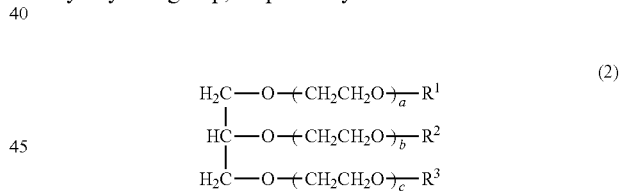

(2)

In the formula (2), $R^1$, $R^2$, $R^3$, a, b and c are the same as the $R^1$, $R^2$, $R^3$, a, b and c defined in the formula (1).

The a, b and c showing the average number of the oxyalkylene groups added are preferably 1 or more, respectively. The total of a, b and c, that is, a+b+c, is preferably 3 to 60, more preferably 3 to 50, still more preferably 3 to 30 and still further preferably 4 to 20.

HLB (Hydrophile-Lipophile Balance) of the ether ester is not particularly limited, and is, for example, 3 to 15 and preferably 5 to 14. The HLB used herein is a value calculated from the following Griffin's formula. The proportion of a hydrophilic moiety occupied in the whole molecule is large and hydrophilicity is high, as the value is large.

HLB=20+(Molecular weight of hydrophilic moiety)/(Whole molecular weight) wherein the molecular weight of the hydrophilic moiety is the molecular weight of polyoxyalkylene chains represented by $(R^4O)_a$, $(R^5O)_b$ and $(R^6O)_c$.

The amount of the ether ester added is not particularly limited, but is preferably 1 to 10 parts by mass and more preferably 2 to 8 parts by mass, per 100 parts by mass of the diene rubber. When the amount of the ether ester added is too large, tensile stress is deteriorated and the improvement effect of abrasion resistance tends to decrease. Therefore, the amount of the ether ester added is preferably 10 parts by mass or less.

The rubber composition according to the present embodiment can further contain various additives generally used in a rubber composition, such as a silane coupling agent, oil, zinc flower, stearic acid, an age resister, a wax, a vulcanizing agent and a vulcanization accelerator, other than the above-described components.

Examples of the silane coupling agent include sulfide silane and mercaptosilane. The amount of the silane coupling agent added is not particularly limited, but is preferably 2 to 20 mass % based on the amount of the silica added.

Sulfur is preferably used as the vulcanizing agent. The amount of the vulcanizing agent added is not particularly limited, but is preferably 0.1 to 10 parts by mass and more preferably 0.5 to 5 parts by mass, per 100 parts by mass of the diene rubber. Examples of the vulcanization accelerator include various vulcanization accelerators such as a sulfenamide type, a thiuram type, a thiazole type and a guanidine type. Those can be used in one kind alone or as mixtures of two or more kinds thereof. The amount of the vulcanization accelerator is not particularly limited, but is preferably 0.1 to 7 parts by mass and more preferably 0.5 to 5 parts by mass, per 100 parts by mass of the diene rubber.

The rubber composition according to the present embodiment can be prepared by kneading the necessary components according to the conventional method using a mixing machine generally used, such as Banbury mixer, a kneader or rolls. Specifically, for example, additives other than a vulcanizing agent and a vulcanization accelerator are added to a diene rubber together with silica and ether ester, followed by mixing, in a first mixing steep (non-productive mixing step). A vulcanizing agent and a vulcanization accelerator are added to the mixture thus obtained, followed by mixing, in a final mixing step (productive mixing step). Thus, an unvulcanized rubber composition can be prepared.

The rubber composition according to the present embodiment can be used as a rubber composition for a tire. Examples of the tire include pneumatic tires for various uses and having various sizes, such as tires for passenger cars and tires for heavy load of trucks or buses. The pneumatic tire according to one embodiment has a rubber part comprising the rubber composition. Examples of the site of a tire in which the rubber composition is used include a tread rubber and a sidewall rubber. The rubber composition is preferably used in a tread rubber. The tread rubber of a pneumatic tire include a tread rubber comprising a two-layered structure of a cap rubber and a base rubber, and a single layer structure in which those are integrated. The rubber composition is preferably used in a rubber constituting a ground contact surface. That is, it is preferred that when the tread rubber has a single layer structure, the tread rubber comprises the rubber composition, and when the tread rubber has a two-layered structure, the cap rubber comprises the rubber composition.

A method for manufacturing a pneumatic tire is not particularly limited. For example, the pneumatic tire can be produced by molding the rubber composition into a given shape by extrusion processing according to the conventional method and preparing an unvulcanized tire (green tire) by combining with other members. For example, a tread rubber is prepared using the rubber composition and an unvulcanized tire is prepared by combining with other tire members. The unvulcanized tire is then vulcanization molded at a temperature of, for example, 140 to 180° C. Thus, a pneumatic tire can be manufactured.

EXAMPLES

The present invention is described in detail below by reference to Examples, but the invention is not construed as being limited to those Examples.

Measurement of Average Degree of Esterification

The average degree of esterification was calculated using $^{13}$C-NMR. The measurement conditions are observation nucleus: $^{13}$C, observation frequency: 100.648 MHz, pulse width: 90° C., solvent: CDCl$_3$, and concentration: 5 mass %. The calculation method used the following calculation formula.

Degree of esterification=(Peak area of ester carbon appeared in the vicinity of 173.8 ppm)/(Peak area of the following carbon (I) appeared in the vicinity of 78.3 ppm)

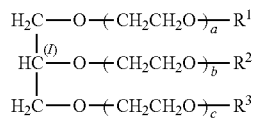

Synthesis of Ether Ester

Ether esters 1 to 5 used in Examples and Comparative Examples were synthesized by the following methods.

Ether Ester 1

0.2 g of a potassium hydroxide catalyst was added to 30 g (0.33 mol) of glycerin (manufactured by Tokyo Chemical Industry Co., Ltd.), 73 g (1.65 mol) of ethylene oxide (manufactured by Tokyo Chemical Industry Co., Ltd.) was injected to the resulting mixture while stirring the mixture at 110 to 120° C., and an addition reaction was conducted. The resulting reactant was transferred to a flask, and potassium hydroxide as the catalyst was neutralized with phosphoric acid. A phosphoric acid salt was filtered off from the resulting neutralized product and 78 g of a polyoxyethylene compound was obtained (yield: 90 mass %). 60 g (0.23 mol) of the polyoxyethylene compound obtained was reacted with 75 g (0.25 mol) of oleic chloride (manufactured by Tokyo Chemical Industry Co., Ltd.) in a THF solvent in the presence of a triethylamine catalyst, and 87 g of ether ester 1 was obtained (yield: 72 mass %). The ether ester 1 is a monoester of polyoxyethylene glycerin fatty acid ester represented by the formula (2) (a+b+c=5, acyl group: —COC$_{17}$H$_{33}$, average degree of esterification: 1.1 and HLB: 8).

Ether Ester 2

0.1 g of a potassium hydroxide catalyst was added to 10 g (0.11 mol) of glycerin (manufactured by Tokyo Chemical Industry Co., Ltd.), 58 g (1.3 mol) of ethylene oxide (manufactured by Tokyo Chemical Industry Co., Ltd.) was injected to the resulting mixture while stirring the mixture at 110 to 120° C., and an addition reaction was conducted. The resulting reactant was transferred to a flask, and potassium hydroxide as the catalyst was neutralized with phosphoric acid. A phosphoric acid salt was filtered off from the resulting neutralized product and 56 g of a polyoxyethylene compound was obtained (yield: 89 mass %). 40 g (0.07 mol) of the polyoxyethylene compound obtained was reacted with 24 g (0.08 mol) of oleic chloride (manufactured by Tokyo Chemical Industry Co., Ltd.) in a THF solvent in the presence of a triethylamine catalyst, and 41 g of ether ester 2 was obtained (yield: 70 mass %). The ether ester 2 is a monoester of polyoxyethylene glycerin fatty acid ester represented by the formula (2) (a+b+c=11.8, acyl group: —$COC_{17}H_{33}$, average degree of esterification: 1.2 and HLB: 13).

Ether Ester 3

0.1 g of a potassium hydroxide catalyst was added to 10 g (0.11 mol) of glycerin (manufactured by Tokyo Chemical Industry Co., Ltd.), 73 g (1.65 mol) of ethylene oxide (manufactured by Tokyo Chemical Industry Co., Ltd.) was injected to the resulting mixture while stirring the mixture at 110 to 120° C., and an addition reaction was conducted. The resulting reactant was transferred to a flask, and potassium hydroxide as the catalyst was neutralized with phosphoric acid. A phosphoric acid salt was filtered off from the resulting neutralized product and 67 g of a polyoxyethylene compound was obtained (yield: 81 mass %). 50 g (0.07 mol) of the polyoxyethylene compound obtained was reacted with 17.5 g (0.08 mol) of lauroyl chloride (manufactured by Tokyo Chemical Industry Co., Ltd.) in a THF solvent in the presence of a triethylamine catalyst, and 44 g of ether ester 3 was obtained (yield: 67 mass %). The ether ester 3 is a monoester of polyoxyethylene glycerin fatty acid ester represented by the formula (2) (a+b+c=15, acyl group: —$COC_{11}H_{23}$, average degree of esterification: 1.0 and HLB: 14).

Ether Ester 4

0.1 g of a potassium hydroxide catalyst was added to 10 g (0.11 mol) of glycerin (manufactured by Tokyo Chemical Industry Co., Ltd.), 29 g (0.66 mol) of ethylene oxide (manufactured by Tokyo Chemical Industry Co., Ltd.) was injected to the resulting mixture while stirring the mixture at 110 to 120° C., and an addition reaction was conducted. The resulting reactant was transferred to a flask, and potassium hydroxide as the catalyst was neutralized with phosphoric acid. A phosphoric acid salt was filtered off from the resulting neutralized product and 36 g of a polyoxyethylene compound was obtained (yield: 92 mass %). 32 g (0.09 mol) of the polyoxyethylene compound obtained was reacted with 54 g (0.18 mol) of oleic chloride (manufactured by Tokyo Chemical Industry Co., Ltd.) in a THF solvent in the presence of a triethylamine catalyst, and 49 g of ether ester 4 was obtained (yield: 62 mass %). The ether ester 4 is a diester of polyoxyethylene glycerin fatty acid ester represented by the formula (2) (a+b+c=6, acyl group: —$COC_{17}H_{33}$, average degree of esterification: 2.1 and HLB: 6).

Ether Ester 5

0.1 g of a potassium hydroxide catalyst was added to 5 g (0.054 mol) of glycerin (manufactured by Tokyo Chemical Industry Co., Ltd.), 64 g (1.46 mol) of ethylene oxide (manufactured by Tokyo Chemical Industry Co., Ltd.) was injected to the resulting mixture while stirring the mixture at 110 to 120° C., and an addition reaction was conducted. The resulting reactant was transferred to a flask, and potassium hydroxide as the catalyst was neutralized with phosphoric acid. A phosphoric acid salt was filtered off from the resulting neutralized product and 50 g of a polyoxyethylene compound was obtained (yield: 73 mass %). 50 g (0.04 mol) of the polyoxyethylene compound obtained was reacted with 39 g (0.13 mol) of oleic chloride (manufactured by Tokyo Chemical Industry Co., Ltd.) in a THF solvent in the presence of a triethylamine catalyst, and 47 g of ether ester 5 was obtained (yield: 65 mass %). The ether ester 5 is a triester of polyoxyethylene glycerin fatty acid ester represented by the formula (2) (a+b+c=27, acyl group: —$COC_{17}H_{33}$, average degree of esterification: 3.0 and HLB: 13).

Preparation and Evaluation of Rubber Composition

Banbury mixer was used. Compounding ingredients excluding sulfur and a vulcanization accelerator were added to a rubber component according to the formulations (parts by mass) shown in Table 1 below, followed by kneading, in a first mixing step (discharge temperature: 160° C.). Sulfur and a vulcanization accelerator were added to the kneaded mixture obtained above, followed by kneading, in a final mixing step (discharge temperature: 90° C.). Thus, each rubber composition was prepared. The details of each component in Table 1 are as follows.

SBR: "TUFDENE 4850 manufactured by Asahi Kasei Corporation (Oil extended rubber containing oil in amount of 50 parts by mass per 100 parts by mass of rubber polymer. Rubber polymer content is shown by parenthesis in the Table)

BR: "BR150B" manufactured by Ube Industries, Ltd.

Carbon black: "DIABLACK N330" manufactured by Mitsubishi Chemical Corporation

Silica: "NIPSIL AQ" (BET: 205 $m^2/g$) manufactured by Tosoh Silica Corporation

Silane coupling agent: "Si69" manufactured by Evonik Degussa

Oil: "PROCESS NC140" manufactured by JX Nippon Oil & Sun-Energy Corporation

Zinc flower: "Zinc Flower #1" manufactured by Mitsui Mining & smelting Co., Ltd.

Age resister: "NOCRAC 6C" manufactured by Ouchi Shinko Chemical Industrial Co., Ltd.

Stearic acid: "LUNAC S-20" manufactured by Kao Corporation

Processing aid: "AKTIPLAST PP" manufactured by LANXESS

Sulfur: "POWDERED SULFUR" manufactured by Tsurumi Chemical Industry Co., Ltd.

Vulcanization accelerator 1: "NOCCELER D" manufactured by Ouchi Shinko Chemical Industrial Co., Ltd.

Vulcanization accelerator 2: "SOXINOL CZ" manufactured by Sumitomo Chemical Co., Ltd.

Processability of each rubber composition obtained was evaluated, and tensile stress and abrasion resistance were evaluated using a test piece having a predetermined shape obtained by vulcanizing each rubber composition at 160° C. for 30 minutes. Each measurement and evaluation method is as follows.

Processability: An vulcanized rubber was preheated at 100° C. for 1 minute and a torque value after 4 minutes was measured in Mooney unit using a rotorless Mooney viscometer manufactured by Toyo Seiki Co., Ltd. according to JIS K6300. Inverse number of the measurement value was indicated by an index as the value of Comparative Example 1 being 100. Larger index means that Mooney viscosity is low and processability is excellent.

Tensile stress: Tensile stress at 300% elongation was measured according to JIS K6261 and indicated by an index as the value of Comparative Example 1 being 100. Larger index means higher tensile stress.

Abrasion resistance: Abrasion loss was measured under the conditions of load: 40N and slip ratio: 30% using Lambourn abrasion tester manufactured by Iwamoto Seisakusho. Inverse number of the measurement value was indicated by an index as the value of Comparative Example 1 being 100. Larger index means that abrasion loss is low and processability is excellent.

TABLE 1

| | Com. Ex. 1 | Ex. 1 | Ex. 2 | Ex. 3 | Ex. 4 | Com. Ex. 2 | Com. Ex. 3 | Ex. 5 | Ex. 6 | Ex. 7 | Com. Ex. 4 | Ex. 8 |
|---|---|---|---|---|---|---|---|---|---|---|---|---|
| Formulation (Parts by mass) | | | | | | | | | | | | |
| SBR | 112.5 (75) | 112.5 (75) | 112.5 (75) | 112.5 (75) | 112.5 (75) | 112.5 (75) | 112.5 (75) | 112.5 (75) | 112.5 (75) | 112.5 (75) | 112.5 (75) | 112.5 (75) |
| BR | 25 | 25 | 25 | 25 | 25 | 25 | 25 | 25 | 25 | 25 | 25 | 25 |
| Carbon black | 10 | 10 | 10 | 10 | 10 | 10 | 10 | 10 | 10 | 10 | 10 | 10 |
| Silica | 80 | 80 | 80 | 80 | 80 | 100 | 100 | 100 | 100 | 100 | 120 | 120 |
| Silane coupling agent | 8 | 8 | 8 | 8 | 8 | 10 | 10 | 10 | 10 | 10 | 10 | 10 |
| Oil | 5 | 5 | 5 | 5 | 5 | 10 | 10 | 10 | 10 | 10 | 10 | 10 |
| Zinc flower | 3 | 3 | 3 | 3 | 3 | 3 | 3 | 3 | 3 | 3 | 3 | 3 |
| Age resister | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 |
| Processing aid | 5 | — | — | — | — | 5 | — | — | — | — | 5 | — |
| Ether ester 1 (Monoester) | — | 5 | — | — | — | — | — | 5 | — | — | — | — |
| Ether ester 2 (Monoester) | — | — | 5 | 2 | 8 | — | — | — | — | — | — | 5 |
| Ether ester 3 (Monoester) | — | — | — | — | — | — | — | — | 5 | — | — | — |
| Ether ester 4 (Diester) | — | — | — | — | — | — | — | — | — | 5 | — | — |
| Ether ester 5 (Triester) | — | — | — | — | — | — | 5 | — | — | — | — | — |
| Sulfur | 2 | 2 | 2 | 2 | 2 | 2 | 2 | 2 | 2 | 2 | 2 | 2 |
| Vulcanization accelerator 1 | 1.5 | 1.5 | 1.5 | 1.5 | 1.5 | 1.5 | 1.5 | 1.5 | 1.5 | 1.5 | 1.5 | 1.5 |
| Vulcanization accelerator 2 | 1.5 | 1.5 | 1.5 | 1.5 | 1.5 | 1.5 | 1.5 | 1.5 | 1.5 | 1.5 | 1.5 | 1.5 |
| Evaluation (Index) | | | | | | | | | | | | |
| Processability | 100 | 107 | 107 | 104 | 111 | 92 | 94 | 97 | 95 | 98 | 84 | 94 |
| Tensile stress | 100 | 108 | 110 | 108 | 112 | 103 | 105 | 109 | 108 | 107 | 107 | 114 |
| Abrasion resistance | 100 | 109 | 111 | 114 | 106 | 100 | 98 | 107 | 111 | 109 | 96 | 103 |

The results obtained are shown in Table 1 above. The improvement effect was recognized in all of processability, abrasion resistance and tensile stress in Examples 1 to 4 using ether ester, as compared with Comparative Example 1 using a processing aid comprising a fatty acid metal salt.

Even when silica was added in an amount of 100 parts by mass, the improvement effect was recognized in all of processability, abrasion resistance and tensile stress in Examples 5 to 7 using ether ester, as compared with Comparative Example 2 using a processing aid comprising a fatty acid metal salt. Comparative Example 3 uses triester as ether ester, and the improvement effect of abrasion resistance was apparently inferior to that of Examples 5 to 7 using monoester or diester.

Even when silica was added in an amount of 120 parts by mass, the improvement effect was recognized in all of processability, abrasion resistance and tensile stress in Example 8 using ether ester, as compared with Comparative Example 4 using a processing aid comprising a fatty acid metal salt.

Some embodiments of the present invention are described above, but those embodiments are describe as examples and are not intended to limit the scope of the invention. Those embodiments can be carried out in other various modifications, and various omissions, replacements and changes can be made within a range that does not deviate from the gist of the invention. The omission, replacement, change and the like are included in the scope and gist of the invention, and are also included in the inventions described in the claims and their equivalent ranges.

What is claimed is:

1. A rubber composition for a tire comprising a diene rubber, silica and an ether ester of polyoxyalkylene glycerin fatty acid ester represented by the following general formula (1):

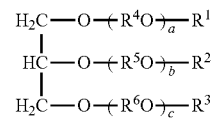

(1)

wherein $R^1$, $R^2$ and $R^3$ each represent a hydrogen atom or an acyl group having a saturated or unsaturated alkyl group having 6 to 30 carbon atoms, $R^4$, $R^5$ and $R^6$ each independently represent an alkylene group having 2 to 4 carbon atoms, a, b and c each independently represent an average number of moles added and 60 mass % or more of $(R^4O)_a$, $(R^5O)_b$ and $(R^6O)_c$ consists of an oxyethylene group, wherein the ether ester has an average degree of esterification of 0.8 to 2.2.

2. The rubber composition for a tire according to claim 1, wherein the silica is contained in an amount of 20 to 120 parts by mass per 100 parts by mass of the diene rubber and the ether ester is contained in an amount of 1 to 10 parts by mass per 100 parts by mass of the diene rubber.

3. The rubber composition for a tire according to claim 1, wherein the ether ester is a monoester of polyoxyalkylene glycerin fatty acid ester.

4. The rubber composition for a tire according to claim 1, wherein the ether ester is a diester of polyoxyalkylene glycerin fatty acid ester.

5. The rubber composition for a tire according to claim 1, wherein the ether ester has a hydrophile-lipophile balance of 5 to 14.

6. The rubber composition for a tire according to claim 1, wherein, in general formula (1), 80 mass % or more of $(R^4O)_a$, $(R^5O)_b$ and $(R^6O)_c$ consists of an oxyethylene group.

7. A pneumatic tire manufactured using the rubber composition for a tire according to claim 1.

* * * * *